United States Patent [19]
McFarlane et al.

[11] Patent Number: 5,916,432
[45] Date of Patent: Jun. 29, 1999

[54] PROCESS FOR DISPERSING TRANSITION METAL CATALYTIC PARTICLES IN HEAVY OIL

[75] Inventors: Richard Anthony McFarlane; Ted Cyr; Randall Wayne Tedford Hawkins, all of Edmonton, Canada

[73] Assignee: Alberta Oil Sands Technology and Research Authority, Canada

[21] Appl. No.: 08/936,802

[22] Filed: Sep. 24, 1997

[51] Int. Cl.⁶ .................................................... C10G 35/00
[52] U.S. Cl. .................. 208/153; 208/108; 208/106; 208/127; 208/362; 208/112; 208/110; 208/359; 502/164; 502/161; 502/220
[58] Field of Search ...................... 208/108, 106, 208/112, 110, 359, 362, 153; 502/164, 167, 220

[56] References Cited

U.S. PATENT DOCUMENTS

| | | | |
|---|---|---|---|
| 3,161,585 | 12/1964 | Glehn et al. | 208/264 |
| 4,542,121 | 9/1985 | Mitchell, III | 502/164 |
| 4,568,450 | 2/1986 | Ting et al. | 208/216 |
| 4,578,181 | 3/1986 | Derouane et al. | 208/110 |
| 4,592,827 | 6/1986 | Galiasso et al. | 208/59 |
| 4,824,821 | 4/1989 | Lopez | 502/220 |
| 5,162,282 | 11/1992 | Lopez | 502/220 |
| 5,283,217 | 2/1994 | Ikura et al. | 502/167 |
| 5,578,197 | 11/1996 | Cyr et al. | 208/112 |

FOREIGN PATENT DOCUMENTS 1593007  7/1981  United Kingdom .

OTHER PUBLICATIONS

R.O. Skamser et al., "Low Sulfur Products from High Sulfur Crude Oil . . . ", Energy Progress, 1(1–4):45–48, Dec. 1981.

*Primary Examiner*—Helane Myers
*Attorney, Agent, or Firm*—Millen, White, Zelano & Branigan, P.C.

[57] ABSTRACT

A transition metal salt, preferably ammonium heptamolybdate, is dissolved in water to provide a solution containing the dispersed catalyst precursor. The solution is atomized by passing it through an atomizing nozzle submerged in hot oil. The minute atomized droplets are delivered into the hot oil and the water is flashed to form steam bubbles. The precursor forms catalytic particles distributed in the oil.

6 Claims, 2 Drawing Sheets

PROCESS FOR DISPERSING TRANSITION METAL CATALYTIC PARTICLES IN HEAVY OIL

FIELD OF THE INVENTION

The present invention relates to a process for dispersing transition metal catalytic particles in heavy oil using an atomizing procedure.

BACKGROUND OF THE INVENTION

Catalysts are used to improve the yield of saleable hydrocarbon products from thermal cracking of heavy oil, such as bitumen. The catalyst typically may consist of molybdenum or tungsten alone or combined with nickel or cobalt, carried on an alumina support. In the case of bitumen, both thermal cracking and hydrogen addition facilitated by the above catalysts are used in the upgrading process.

One of the major problems in such catalytic hydrocracking of heavy oil is the eventual loss of catalytic activity due to the deposition of metals and coke on the catalyst and catalyst support. Deactivation of the catalyst in this way requires that the catalyst be replaced or regenerated.

As a result, in recent years research has been carried out to develop an alternative to supported catalysts. One promising alternative is what can be called in situ-generated disposable catalysts. An oil-soluble transition metal compound catalyst precursor, such as molybdenum naphthenate, is distributed in the oil and heated to hydrocracking temperature. The precursor decomposes and reacts with sulfur moieties in the oil to form minute catalytic particles, such as molybdenum sulfide. Such small quantities of the catalyst (for example 100 ppm) are effective that single pass use is justified—hence the terminology "disposable".

To be effective in minimizing coke formation and maximizing liquid product yields, it has been shown that the in situ-generated catalytic particles need to be minute in size, typically less than 10 microns average mean diameter, thereby having a high surface area; they also need to be well distributed in the viscous oil.

Creating such catalytic particles which are minute in size and which are well distributed in the viscous oil has not been found easy to do. U.S. Pat. No. 5,578,197, issued to Cyr et al., discloses a technique involving dissolving molybdenum naphthenate precursor in the oil to be hydrocracked and distributing it therein by prolonged mixing at a mild temperature (selected so that the viscosity of the oil is reduced but decomposition of the precursor is avoided). Then the mixture is introduced to the hydrocracking reactor and the precursor decomposes and reacts with sulfur moieties in the oil to form the catalyst, when exposed to hydrocracking temperature. However, even though this technique has utility, the use of molybdenum naphthenate as the catalyst precursor is expensive.

An inexpensive source of molybdenum is the salt, ammonium heptamolybdate (hereinafter referred to as "AHM"). AHM is readily available in a coarse crystalline form.

However AHM, while water-soluble, is not oil-soluble; therefore it is not amenable to the technique disclosed in the Cyr et al. patent.

The work underlying the present invention has therefore been focussed on developing a process for using AHM as the catalyst precursor and dispersing it as very fine catalytic particles distributed in the heavy oil medium. However, it is contemplated that the dispersion process can also be applied to other transition metals as well.

For purposes of this application, the term "catalytic particle" is intended to cover both an in situ-generated catalyst precursor particle and the catalytically active particle produced from it. In the case of AHM, the term "catalytic particle" is intended to encompass one or more of: ammonium heptamolybdate, molybdenum oxides precursor particles derived from ammonium heptamolybdate, a mixture of molybdenum oxide precursor particles and molybdenum sulfide catalyst particles, and molybdenum sulfide catalyst particles.

SUMMARY OF THE INVENTION

In accordance with a specific embodiment of the invention, AHM is first dissolved in water, to form an aqueous solution. This aqueous solution is then atomized by pumping it under pressure through an atomizing nozzle. The outlet of the nozzle is preferably kept submerged in the hot heavy oil during atomization. Minute droplets of water containing minute quantities of AHM are discharged from the nozzle outlet into the hot oil. The temperature of the oil is at least sufficiently high (>100° C.) so that the water in the droplets is flashed off as steam. Minute particulate, derived from the AHM, materialize, distributed in the oil. These particulates are catalytic particles, having an average mean diameter less than about 10 microns.

The temperature of the oil preferably will be maintained at a level sufficiently high (>150° C.) so that four moles of water of crystallization and one mole of ammonia are driven off per mole of AHM and the particulates comprise molybdenum oxide catalyst precursor. If the oil is at hydrocracking temperature (typically >400° C.) the particulates will react with sulfur moieties in the oil and form molybdenum sulfide catalyst particles.

Variation of the concentration of AHM in the aqueous solution and the pressure used in atomizing can be used to vary droplet size and catalytic particle size and quantity.

The dispersion process therefore involves the combination of:

- dissolving the AHM in water to uniformly disperse it;
- atomizing the solution to produce a minute amount of AHM in a minute droplet and to distribute the AHM in the oil;
- removing the water by flashing it using the heat in the oil;
- reducing losses of catalytic particles with the steam by keeping the nozzle outlet submerged;
- converting the AHM to a minute particulate form by precipitating it in the oil medium in which it is insoluble; and
- using the heat of the oil to raise the temperature of the catalyst precursor sufficiently so that it decomposes and reacts with sulfur moieties associated with the heavy oil to produce minute molybdenum sulfide catalyst particles.

Broadly stated, the invention is a dispersion process producing catalytic particles distributed in heavy oil, comprising: dissolving a transition metal catalyst precursor, that is insoluble in oil, in water to provide an aqueous solution; atomizing the solution to produce fine droplets; discharging the droplets into hot heavy oil having a temperature sufficient to flash the water; and flashing the water and producing catalytic particles distributed in the oil.

DETAILED DESCRIPTION OF THE PREFERRED EMBODIMENT

The invention is exemplified in the description of experimental tests now described.

The Reactants

Precursor catalyst ammonium heptamolybdate ($(NH_4)_6Mo_7O_{24}.4H_2O$) or "AHM" was dissolved in de-ionized distilled water to form an aqueous solution S. The AHM was obtained from Fischer Scientific. The heavy oil R was bitumen from the Cold Lake region of Alberta, Canada. Tables 1 and 2 illustrate the bitumen's properties:

TABLE 1

| Carbon | 82.8 (wt. %) | Asphaltenes | 16.9 (wt. %) |
|---|---|---|---|
| Hydrogen | 10.4 (wt. %) | CCR* | 12.6 (wt. %) |
| Nitrogen | 0.40 (wt. %) | Nickel | 66 (ppm) |
| Sulfur | 4.60 (wt. %) | Vanadium | 178 (ppm) |
| Water | 1.54 (wt. %) | | |

*CCR indicates Conradson Carbon Residue

TABLE 2

| IBP - 177° C.: 1.7 wt. % | Density @ 15.6° C.: 0.9951 |
|---|---|
| 177–350° C.: 14.7 wt. % | Viscosity 8675 cps (@ 38° C.) |
| 350–525° C.: 29.4 wt. % | |
| 525° C.+: 54.2 wt. % | |

In the course of practising the method of the invention, the solution S and oil R were combined to form a hydrocracking reaction feedstock F.

The Equipment

Figure 1:
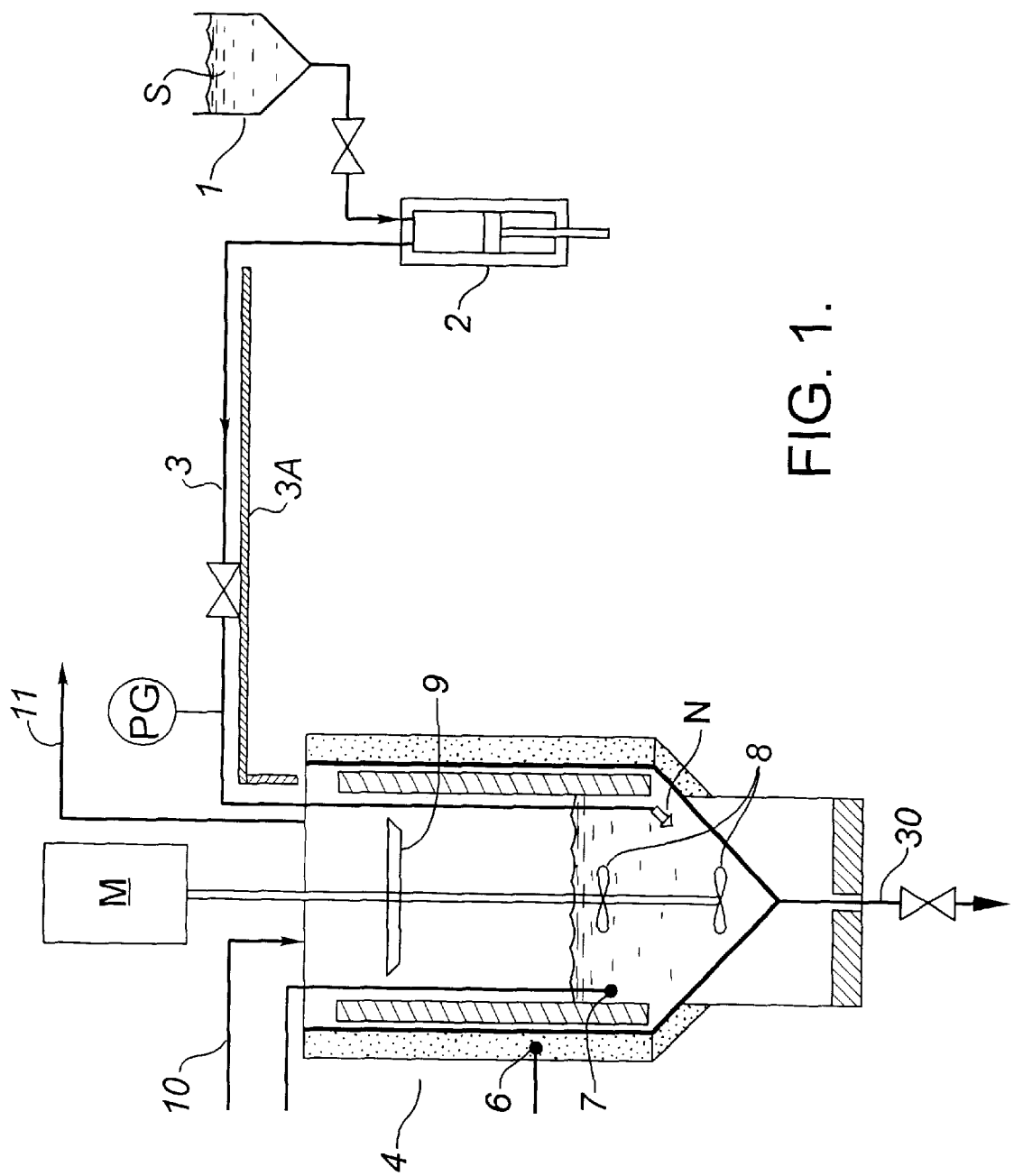
FIG. 1 is a schematic showing the experimental equipment used to produce oil containing catalytic particles.

As shown in FIG. 1, reservoir 1 stored solution S. Pump 2 drew solution S from reservoir 1 and directed it along line 3 to a feedstock tank 4. Line 3 was heated with heat-tracing 3a to raise the solution S to sub-vaporization temperatures. The pump 2 was a dual syringe-type, ISCO 500D Continuous Flow System supplied by Canaberra Packard Canada. The pump 2 had a fill capacity of 500 ml and was microprocessor controlled for providing smooth, pulse free, continuous delivery.

The feedstock tank 4 contained the heavy oil R and had a capacity of 55 liters. An external electrical heater 5 rated for 3700 watts provided heat into tank 4.

Thermocouples 6, 7 monitored and controlled the temperature of the oil R in tank 4.

Two lower mechanical stirrers 8 provided mixing capability in tank 4. An upper mechanical stirrer 9 provided foam chopping capability.

A nitrogen purge tube 10 and flue 11 were provided for flushing the feedstock tank 4, to exclude oxygen, and stripping evolved water vapour and ammonia.

Nozzle N was installed low in the tank, submerged in the oil R. Pump 2 delivered solution S through line 3 to the nozzle N for discharge into the oil R. The nozzle N was a Type WDA 0.5/30° atomizing oil burner nozzle manufactured by Delavan Inc. of Bamberg, S.C. Nozzle N had an orifice diameter of 0.0083 inches, which produced a hollow cone spray pattern with a 30° spread when operated at a flow rate of at least 50 ml/min.

Figure 2:
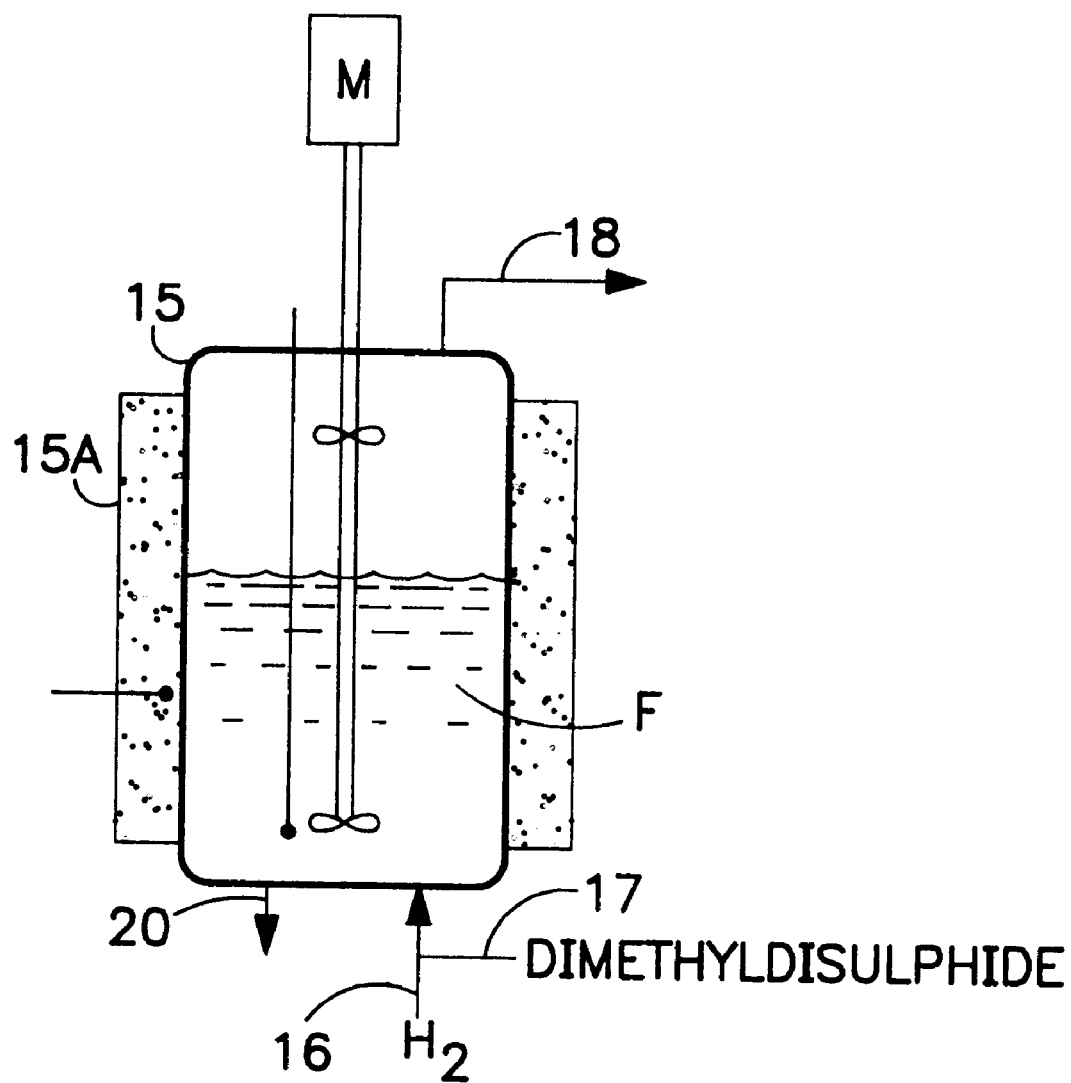
FIG. 2 is a schematic showing the experimental equipment used for thermally hydrocracking the product prepared in the equipment of FIG. 1.

Having reference to FIG. 2, once the solution S and oil R were combined, the resultant feedstock F produced from the feedstock tank 4 was charged through line 30 into storage drums until ready for use. The prepared feedstock with catalyst precursor was found to be stable over at least one year. The prepared feedstock F was charged to a 2 liter, semi-batch autoclave reactor 15 for conducting catalytic hydrocracking tests. The reactor 15 was heated by heater 15a, which was able to raise the feedstock F to temperatures in excess of 450° C. The reactor 15 could operate at pressures up to 5500 psig at 340° C. Lower port 16 was provided for introducing hydrogen gas under pressure for producing hydrocracking conditions. Vapour line 17 conducted cracked products away for condensation. Port 18 was provided for introducing a sulphiding agent into the feedstock, namely dimethyldisulphide $(CH_3)_2S_2$.

Feedstock Preparation

Feedstocks F-1, F-2 and F-3 were prepared. Table 3 sets forth the feedstock preparation conditions. Feedstock F-1 was prepared with a low concentration of AHM in solution; feedstock F-2 was prepared with a high AHM concentration; and feedstock F-3 was prepared with a high AHM concentration and a surfactant.

TABLE 3

| | | F-1 | F-2 | F-3 |
|---|---|---|---|---|
| Bitumen Charge | Kg | 14.88 | 15.04 | 14.00 |
| it. Temp (nominal 140) | °C. | 140–145 | 140–146 | 137–139 |
| AHM Solution Conc. | Wt. % | 0.02 | 0.20 | 0.2 |
| Surf. Tension @ 25° C. | Dyne/cm | 72.0 | 72.0 | 25.5 |
| Nozzle Injection Rate | ML/min | 50.00 | 50.00 | 50.00 |
| Injection Pressure | Psig | 400 | 400 | 400 |

For feedstock F-1 compared to F-2, the concentration of AHM solution was lower by a factor of 10 and the volume of injected solution was higher by a factor of 2. Thus, feedstock F-1 would be expected to have an effective precursor concentration that is 5 times lower than that for feedstock F-2. However, the consequence of the lower solution concentration of AHM injected for preparation of F-1 is that the particles produced are smaller and their total effective surface will be comparable with the particles in feedstock F-2.

Feedstock F-3 included 0.088 wt. % of the surfactant sodium sulfosuccinate, supplied by Sigma Chemical Co. Of St. Louis, Mo.

The Reactor Conditions

The following conditions were common for the baseline hydrocracking tests T-1 to T-4 and T-8. The reactor 15 was charged with about 750 g of feedstock F-1, F-2, F-3 or bitumen. The reactor 15 was pressurized to 1000 psig, under $H_2$, at room temperature. The temperature was ramped up to 350° C. The resultant pressure in reactor 15 was about 2000 psig. $H_2$ was flowed through port 16 into the 350° C. reactor 15 at 2 std. liters/min (slpm) for 30 minutes. The $H_2$ flow was then stopped.

At this point, for some tests, 10 g of dimethyldisulphide was introduced through port 17, from the bottom of reactor 15, to ensure the availability of reactive sulphur, to activate the precursor catalyst.

The reactor 15 was held under static conditions at 350° C. for a further 30 minutes. Then the temperature was ramped up to 450° C. while $H_2$ rate was increased to a flow of 6 slpm. The 30 minute hold and the temperature ramp to 450° C. was performed to ensure sulphiding of the precursor catalyst AHM particles in the feedstock F.

Another example shows that the addition of dimethyldisulphide and the activation step at 350° C. is not necessary and that the catalyst precursor is converted to the active catalyst during the process of heating the feedstock to catalytic hydrocracking conditions. The reactor 15 was then held at 450° C. for a further 45 minutes with the $H_2$ flow at 6 slpm to hydrocrack the feedstock F-2. Test T-5 was carried out as outlined above, except no dimethyldisulphide was added and the temperature was ramped up from room temperature directly to 450° C.

The effect of higher residue (525° C.+) conversion was investigated by increasing the residence time of the feedstock (F-2) at hydrocracking conditions. In test T-6, the reactor 15 was heated directly to 450° C. without addition of dimethyldisulphide and held at that temperature for 90 minutes with the $H_2$ flow at 6 slpm to hydrocrack the feedstock F-2.

The activity of the catalyst in a recycle operation was also assessed. The first stage catalyst activity is typified by test T-7a. In this test, the reactor 15 was heated directly to 450° C. without the addition of dimethyldisulphide and held at that temperature for 70 minutes with the $H_2$ flow at 6 slpm to hydrocrack the feedstock F-2. At the end of the 70 minute period the reactor was cooled and isolated from the rest of the system. The condensate and gas products were collected and the system reassembled. Fresh virgin bitumen, equal in mass to the liquid collected in the condensers and having no added molybdenum, was added to reactor 15 containing the residue and catalyst. In test T-7b, the second or recycle stage, this new mixture containing fresh bitumen and previously activated and used catalysts was hydrocracked at the same experimental conditions as the first stage test T-7a. In test T-8, the performance of a conventional oil-soluble organo-metallic catalyst was compared to that of the present invention under the same conditions employed in tests T-1–T-4.

Eight tests (T-1 to T-8) were performed and the descriptions and results are shown in Tables 4 and 5.

TABLE 4

| Test | Feedstock | Variable |
|---|---|---|
| T-1 | F-2 | Baseline dimethyldisulphide added. |
| T-2 | F-3 | Effect of surfactant/particle size surfactant and dimethyldisulphide added. |
| T-3 | F-1 | Effect of particle size same calculated particle surface area as T-1 but lower Mo concentration and dimethyldisulphide added. |
| T-4 | F-2 | Effect of dilution same particle size as T-1 but was diluted to ⅓ the concentration by adding bitumen and dimethyldisulphide added. |
| T-5 | F-2 | Reliance on reactant-supplied sulfur No dimethyldisulphide added. |
| T-6 | F-2 | Performance at higher conversion (residence time), no dimethyldisulphide added. |
| T-7a | F-2 | Performance of catalyst particles in once through operation |
| T-7b | F-2 | Performance of catalyst particles when recycled to treat additional amounts of bitumen. |
| T-8 | Bitumen | Conventional organo-metallic soluble catalytic precursor in the oil. |

The resultant product distribution and composition for tests T-1 through T-8 are presented in Table 5. Good catalytic hydrocracking performance is indicated by low coke production (in Table 5, coke=solids less ash) and high liquid yield. Ash is substantially comprised of molybdenum, vanadium and nickel.

TABLE 5

| Test | T-1 | T-2 | T-3 | T-4 | T-5 | T-6 | T-7a | T-7b** | T-8 |
|---|---|---|---|---|---|---|---|---|---|
| Feedstock | F-2 | F-3 | F-1 | F-2 | F-2 | F-2 | F-2 | F-2 | Bitumen |
| Mo Concentration (ppm) | 611 | 471 | 212 | 200 | 611 | 611 | 611 | 611 | 200 |
| Residence Time (min.) | 45 | 45 | 45 | 45 | 45 | 90 | 70 | 70 | 45 |
| Feed (g) | 750.2 | 752.0 | 756.5 | 751.4 | 755.3 | 754.2 | 750.4 | 773.9 | 751.4 |
| Whole Oil (g) | 677.9 | 672.0 | 662.0 | 651.7 | 675.9 | 652.3 | 661.5 | 695.3 | 692.5 |
| Dry Gas (g) | 31.6* | 35.9* | 34.8* | 39.7* | 28.0 | 44.5 | 36.2 | 52.0 | 35.4* |
| $H_2S$ (g) | 17.2* | 18.1* | 17.9* | 16.5* | 14.4 | 17.1 | 15.0 | 15.1 | 16.1* |
| $C_{4-C5}$ (g) | 34.3 | 32.8 | 42.5 | 34.0 | 32.7 | 28.9 | 30.4 | 12.6 | 33.4 |
| Solids (g) | 3.8 | 4.1 | 5.2 | 15.7 | 4.3 | 6.2 | 3.5 | 3.7 | 6.5 |
| Ash (wt % of solids) | 33.1 | 22.9 | 14.4 | 11.2 | 29.8 | 23.3 | 35.8 | 38.4 | 21.7 |
| Liquid (wt. % feed) | 90.4 | 89.2 | 87.5 | 86.7 | 89.5 | 86.5 | 88.2 | 89.8 | 92.2 |
| Dry Gas (wt. % feed) | 4.2* | 4.8* | 4.6* | 5.3* | 3.7 | 5.9 | 4.8 | 6.7 | 4.7* |
| $H_2S$ (wt. % feed) | 2.3* | 2.4* | 2.4* | 2.2* | 1.9 | 2.3 | 2.0 | 1.9 | 2.1* |
| $C_4$–$C_5$ (wt. % feed) | 4.6 | 4.4 | 5.6 | 4.5 | 4.3 | 3.8 | 4.0 | 1.6 | 4.4 |
| Solids (wt. % feed) | 0.5 | 0.5 | 0.7 | 2.1 | 0.6 | 0.8 | 0.5 | 0.5 | 0.9 |
| C (wt. %) | 84.7 | 85.3 | 84.5 | 85.2 | 84.6 | 85.4 | 85.5 | 85.7 | 84.3 |
| H (wt. %) | 11.4 | 10.8 | 11.3 | 10.4 | 11.2 | 12.1 | 11.4 | 11.0 | 10.9 |
| N (wt. %) | 0.28 | 0.30 | 0.30 | 0.23 | 0.31 | 0.45 | 0.34 | 0.49 | 0.30 |
| S (wt. %) | 2.66 | 2.57 | 2.79 | 3.00 | 2.40 | 2.17 | 2.21 | 1.89 | 2.65 |
| H/C Ratio | 1.60 | 1.51 | 1.59 | 1.45 | 1.58 | 1.69 | 1.59 | 1.53 | 1.54 |
| IBP-200° C. (wt. %) | 17.5 | 19.6 | 21.4 | 21.0 | 18.8 | 33.0 | 22.5 | 20.0 | 19.4 |
| 200–343° C. (wt. %) | 34.2 | 34.1 | 34.0 | 33.1 | 33.7 | 38.8 | 37.1 | 36.2 | 37.7 |
| 343–525° C. (wt. %) | 28.4 | 25.6 | 26.7 | 20.5 | 27.4 | 24.3 | 25.9 | 28.3 | 25.2 |

TABLE 5-continued

| Test | T-1 | T-2 | T-3 | T-4 | T-5 | T-6 | T-7a | T-7b** | T-8 |
|---|---|---|---|---|---|---|---|---|---|
| 525° C.+ (wt. %) | 19.9 | 20.8 | 17.9 | 25.4 | 20.1 | 3.8 | 14.5 | 15.6 | 17.8 |
| CCR(wt.%) | 5.9 | 5.0 | 6.8 | 7.0 | 5.6 | 6.6 | 4.0 | 6.8 | 6.6 |
| Asphaltenes (wt. %) | 5.3 | 7.1 | 7.1 | 11.4 | 6.3 | 6.7 | 5.7 | 9.0 | 7.8 |
| Convensions (%) | | | | | | | | | |
| Asphaltenes | 72.3 | 62.6 | 65.7 | 41.3 | 67.5 | 66.7 | 71.0 | 45.9 | 56.3 |
| CCR | 63.4 | 68.3 | 58.8 | 53.0 | 61.8 | 56.6 | 75.4 | 54.3 | 52.5 |
| 525° C.+ | 69.3 | 68.6 | 73.5 | 60.3 | 69.3 | 94.3 | 78.2 | 60.8 | 69.6 |

*includes $CH_4$ and $H_2S$ products from dimethyldisulphide
**convensions based on composite composition of virgin bitumen and reactor bottoms from Example 7b
• includes a calculated 290.33 g reactor bottoms (containing coke and catatyst) from Example 7b and 483.6 g of virgin bitumen More particularly, test T-1 is a base case illustration of one embodiment of the method of the present invention. The results of catalytic hydrocracking using the dispersed catalyst method of the invention in test T-1 were shown to be as effective as the conventional, more expensive, soluble organo-metallic catalyst illustrated in test T-8. Comparable performance was demonstrated by the equally low solids (coke+remaining catalyst) and high liquid yield in both tests T-1 and T-6.

The catalyst particles ($MOS_2$ crystallites) produced in Tests 1–7b were analyzed. The crystallites were needle-shaped and were unencumbered with coke. Individual crystal's minor axes ranged from about 0.5 to 1.5 microns while the major axes varied from 5 to over 30 microns. While the actual particle size along the major axis was relatively large, it is postulated that there is a high proportion of reactive rim and edge sites as compared to basal plane sites so that comparable activity is achieved compared to the catalyst in test T-8.

In test T-2, the feedstock F-3 was prepared by adding a surfactant to the AHM solution to reduce the surface tension. When the surface tension of the AHM solution is reduced, the atomized droplet sizes will be smaller due to the lower surface energy required to create them. Smaller atomized droplets lead to smaller precursor catalyst particle size and greater active surface area for the catalyst.

Despite a final concentration of Mo of only about ⅔ of that for base test T-1, coke production and catalytic activity found in test T-2 were comparable to test T-1. The lower Mo concentration is an effect of the smaller particle catalyst precursor size or the surface tension, resulting in a greater entrainment of particles with the vapor bubbles—the particles were apparently subsequently lost with the evolved vapor before they could mix with the reactant.

In test T-3, a dilute solution of AHM was used, being 1/10 that of base test T-1. Twice as much solution was injected into the reactant, resulting in 611:212 ppm or about ⅓ the final concentration of Mo. Theoretically, the surface area of the produced precursor catalyst in tests T-1 and T-3 was the same. The coke production results were substantially unchanged, suggesting that the dilute solution resulted in more highly dispersed particles, which were more highly reactive and compensated for the lower concentration.

In test T-4, the feedstock F-1 of test T-1 was diluted from 611 to 200 ppm, a similar concentration ratio to that of tests T-3 to T-1. Accordingly, the particle size in test T-4 was presumed to be the same as in T-1, and larger than in T-3. The coke production from T-3 turned out to be three times higher than that from test T-4. Insufficient catalytic activity was provided by the particles in test T-4, suggesting a minimum threshold of catalyst surface area per weight of reactant. While the Mo concentration in tests T-3 and T-4 were similar, the particles in test T-3 were smaller and catalytic hydrocracking performance was better, supporting the case that more highly dispersed particles are more reactive.

In test T-5, no sulfur was added so that all of the sulfur needed to convert AHM to $MoS_2$ had to have come from the bitumen itself. As shown in Table 1, bitumen was high in sulfur. The catalytic hydrocracking performance was substantially the same as that in test T-1, in which sulfur was added via dimethyldisulphide.

As stated and compared in the discussion of test T-1, test T-8 illustrated the performance one achieves using a soluble organo-metallic precursor. The performance of test T-8 was comparable to that of tests T-1, T-2, T-3 and T-5 discussed above.

Test T-6 at a residence time of 90 minutes (twice that of tests T-1 to T-5 and T-8) lead to higher conversion of +525° C. residuum, almost twice as much naphtha but with only a small increase in coke production. Sulphur removal and hydrogen addition (H/C ratio) were also improved.

Test 7-a shows the catalyst performance for a residence time of 70 minutes where the coke formation was 3.5 g (grom 750.4 g of feed). When the reactor bottoms from this test were used to treat an additional 483.6 g of bitumen it should have yielded an additional 2.3 g of coke. Thus, the total coke collected in the recycle test should have been 5.8 g but only 3.7 g was formed. This result shows that the active catalyst resides in the heavy bottoms fraction and is an effective catalyst to treat additional portions of bitumen.

In summary, tests T-1, T-2, and T-3 illustrated the importance of producing highly dispersed particles for obtaining effective catalytic activity. Test T-4 illustrated the obvious need to provide sufficient catalyst. Test T-5 showed that sulfur needed for activating AHM catalyst could be successfully gleaned from the oil itself. Test T-6 showed that the catalyst was effective at high residuum conversion. Test 7a and 7b showed that the catalyst once produced was active in recycle operation.

It is contemplated that the invention may be extended to other transition metal compound catalyst precursors.

The embodiments of the invention in which an exclusive property or privilege is claimed are defined as follows:

1. A dispersion process for producing catalytic particles distributed in heavy oil, comprising:

dissolving a transitional metal catalyst precursor, that is insoluble in oil, in water to provide an aqueous solution;

atomizing the solution by pumping the solution under pressure through an atomizing nozzle to produce find droplets;

discharging the droplets through the submerged outlet of the atomizing nozzle into hot heavy oil having a temperature sufficient to flash the water before coalescence of the droplets can occur; and flashing the water to form steam bubbles and producing minute catalytic particles distributed in the oil.

2. The process as set forth in claim 1 wherein:

the precursor is ammonium heptamolybdate.

3. The process as set forth in claim 2 comprising:

using a concentration of precursor and atomizing through an atomizing nozzle at a pressure operative to produce catalytic particles having an average mean diameter less than about 10 microns.

4. The process as set forth in claim 2 wherein: atomizing is conducted by pumping the solution under pressure through an atomizing nozzle having its outlet submerged in the hot heavy oil.

5. The process as set forth in claim 3 wherein: atomizing is conducted by pumping the solution under pressure through an atomizing nozzle having its outlet submerged in the hot heavy oil.

6. The process as set forth in claim 2 comprising:

using a concentration of precursor and atomizing through an atomizing nozzle at a pressure operative to produce catalytic particles having minor axes between 0.5 to 1.5 microns and major axes between 5 and 30 microns.

* * * * *